US010162617B2

(12) United States Patent
Eltsin et al.

(10) Patent No.: US 10,162,617 B2
(45) Date of Patent: Dec. 25, 2018

(54) BINARY TRANSLATION INTO NATIVE CLIENT

(71) Applicant: Google Inc., Mountain View, CA (US)

(72) Inventors: Evgeny Eltsin, Moscow (RU); Nikolay Igotti, St. Petersburg (RU); Andrey Khalyavin, Moscow Oblast (RU); Dmitry Polukhin, Moscow Oblast (RU)

(73) Assignee: Google LLC, Mountain View, CA (US)

( * ) Notice: Subject to any disclaimer, the term of this patent is extended or adjusted under 35 U.S.C. 154(b) by 36 days.

(21) Appl. No.: 14/915,204

(22) PCT Filed: Apr. 10, 2015

(86) PCT No.: PCT/IB2015/000883
§ 371 (c)(1),
(2) Date: Feb. 26, 2016

(87) PCT Pub. No.: WO2016/162720
PCT Pub. Date: Oct. 13, 2016

(65) Prior Publication Data
US 2017/0039049 A1 Feb. 9, 2017

(51) Int. Cl.
*G06F 9/455* (2018.01)
*G06F 9/30* (2018.01)
(Continued)

(52) U.S. Cl.
CPC ............ *G06F 8/52* (2013.01); *G06F 9/45516* (2013.01); *G06F 9/5077* (2013.01); *G06F 21/53* (2013.01);
(Continued)

(58) Field of Classification Search
CPC ............ G06F 9/30087; G06F 9/30003; G06F 9/45537; G06F 9/44521; G06F 9/30076;
(Continued)

(56) References Cited

U.S. PATENT DOCUMENTS

| 4,456,954 A * | 6/1984 | Bullions, III ............. G06F 9/44 711/207 |
| 6,438,745 B1 * | 8/2002 | Kanamaru .......... G06F 9/44521 717/137 |

(Continued)

FOREIGN PATENT DOCUMENTS

| JP | 2001-514411 | 9/2001 |
| JP | 2011-123917 | 6/2011 |

OTHER PUBLICATIONS

Bennet Yee et al., A Sandbox for Portable, Untrusted x86 Native Code, 2009 IEEE, [Retrieved on Jul 30, 2018]. Retrieved from the internet: <URL: https://static.googleusercontent.com/media/research.google.com/en//pubs/archive/34913.pdf> 15 Pages (1-15) (Year: 2009).*

(Continued)

*Primary Examiner* — Anibal Rivera
(74) *Attorney, Agent, or Firm* — Morgan, Lewis & Bockius LLP (57) ABSTRACT

Systems and methods for binary translation are disclosed. In some implementations, guest software to run in a Native Client environment is received. The guest software is configured to execute at a specified guest hardware architecture and not within the Native Client environment. A binary translation of the guest software into Native Client compatible machine code is provided using emulation software. The Native Client compatible machine code executes within a sandbox for the Native Client environment. The Native Client compatible machine code is executable within an application. Providing the binary translation of the guest software into the Native Client compatible machine code for execution within the sandbox occurs just in time, during a runtime of the emulated guest software, and without porting or recompiling the guest software. Providing the binary (Continued)

translation interleaves with execution of the emulated guest software.

20 Claims, 4 Drawing Sheets

(51) Int. Cl.
| | |
|---|---|
| *G06F 9/44* | (2018.01) |
| *G06F 9/38* | (2018.01) |
| *G06F 9/46* | (2006.01) |
| *G06F 8/52* | (2018.01) |
| *G06F 9/50* | (2006.01) |
| *G06F 21/53* | (2013.01) |
| *G06F 8/20* | (2018.01) |
| *G06F 21/51* | (2013.01) |
| *G06F 21/56* | (2013.01) |

(52) U.S. Cl.
CPC ............ *G06F 8/20* (2013.01); *G06F 9/30174* (2013.01); *G06F 9/4552* (2013.01); *G06F 21/51* (2013.01); *G06F 21/56* (2013.01); *G06F 2221/033* (2013.01)

(58) Field of Classification Search
CPC ............ G06F 9/45545; G06F 9/45504; G06F 9/4426; G06F 9/45516; G06F 9/45525; G06F 9/4552; G06F 9/3885; G06F 21/125; G06F 8/4432; G06F 8/52; G06F 11/0712; G06F 12/109; G06F 12/1408; G06F 12/08; G06F 9/30174; G06F 9/328; G06F 9/5027; G06F 9/455; G06F 9/4411; G06F 9/5077; G06F 21/51; G06F 21/53; G06F 21/56; G06F 8/441; G06F 8/61; G06F 8/20
See application file for complete search history.

(56) References Cited

U.S. PATENT DOCUMENTS

| | | | | | |
|---|---|---|---|---|---|
| 6,463,582 | B1* | 10/2002 | Lethin | ................. | G06F 9/45504 717/138 |
| 6,704,925 | B1* | 3/2004 | Bugnion | ............. | G06F 9/45516 703/26 |
| 7,290,253 | B1* | 10/2007 | Agesen | ...................... | G06F 8/52 717/154 |
| 7,496,494 | B2* | 2/2009 | Altman | ............... | G06F 9/45537 703/23 |
| 7,496,495 | B2* | 2/2009 | Solomon | ............. | G06F 9/45537 703/23 |
| 8,095,773 | B2* | 1/2012 | Greiner | ............... | G06F 12/1009 711/207 |
| 8,281,288 | B1* | 10/2012 | Spencer | ..................... | G06F 8/20 709/201 |
| 8,424,082 | B2* | 4/2013 | Chen | ........................ | G06F 21/53 713/167 |
| 8,640,220 | B1* | 1/2014 | Vincent | ................. | G06F 9/5027 726/11 |
| 9,158,566 | B2* | 10/2015 | Bohizic | ............... | G06F 9/45545 |
| 9,355,246 | B1* | 5/2016 | Wan | ...................... | G06F 21/566 |
| 9,495,183 | B2* | 11/2016 | Bond | ..................... | G06F 9/4552 |
| 2003/0093774 | A1* | 5/2003 | Hilton | ................. | G06F 9/45504 717/138 |
| 2003/0093775 | A1* | 5/2003 | Hilton | ................. | G06F 9/45504 717/138 |
| 2003/0093776 | A1* | 5/2003 | Hilton | ................. | G06F 9/45504 717/138 |
| 2005/0038892 | A1* | 2/2005 | Huang | ................. | H04W 76/10 709/227 |
| 2005/0268071 | A1* | 12/2005 | Blandy | ................. | G06F 12/08 711/208 |
| 2007/0006178 | A1* | 1/2007 | Tan | ...................... | G06F 9/45516 717/136 |
| 2007/0050765 | A1* | 3/2007 | Geisinger | ............... | G06F 9/455 718/1 |
| 2007/0050770 | A1* | 3/2007 | Geisinger | ........... | G06F 9/45537 718/100 |
| 2007/0067769 | A1* | 3/2007 | Geisinger | ............... | G06F 9/4411 718/1 |
| 2007/0074191 | A1* | 3/2007 | Geisinger | ........... | G06F 9/45537 717/148 |
| 2007/0074192 | A1* | 3/2007 | Geisinger | ........... | G06F 9/45537 717/148 |
| 2007/0283324 | A1* | 12/2007 | Geisinger | ............... | G06F 9/455 717/120 |
| 2009/0083720 | A1* | 3/2009 | Bohizic | ............... | G06F 9/45504 717/140 |
| 2009/0113110 | A1* | 4/2009 | Chen | ................... | G06F 9/45558 711/6 |
| 2009/0228262 | A1* | 9/2009 | Farrell | ................. | G06F 11/0712 703/26 |
| 2009/0228882 | A1* | 9/2009 | Wang | .................... | G06F 9/5077 718/1 |
| 2009/0282474 | A1* | 11/2009 | Chen | ....................... | G06F 21/53 726/21 |
| 2009/0282477 | A1* | 11/2009 | Chen | .................... | G06F 21/577 726/22 |
| 2010/0114555 | A1* | 5/2010 | Das | ....................... | G06F 9/45504 703/26 |
| 2010/0274551 | A1* | 10/2010 | Das | ..................... | G06F 9/45504 703/26 |
| 2011/0071813 | A1* | 3/2011 | Bohizic | ............... | G06F 12/1027 703/26 |
| 2011/0071814 | A1* | 3/2011 | Bohizic | ............... | G06F 12/1027 703/26 |
| 2011/0071815 | A1* | 3/2011 | Bohizic | ............... | G06F 12/1027 703/26 |
| 2011/0071816 | A1* | 3/2011 | Bohizic | ................... | G06F 9/328 703/26 |
| 2011/0276962 | A1* | 11/2011 | Chambers | ............. | G06F 9/3885 718/1 |
| 2011/0307876 | A1* | 12/2011 | Ottoni | ..................... | G06F 8/441 717/153 |
| 2011/0320661 | A1* | 12/2011 | Heller | ................. | G06F 9/30087 710/200 |
| 2012/0260067 | A1* | 10/2012 | Henry | ................ | G06F 9/30076 712/200 |
| 2012/0284477 | A1* | 11/2012 | Gainey, Jr. | .......... | G06F 9/30003 711/166 |
| 2012/0296626 | A1* | 11/2012 | Bond | ..................... | G06F 9/4552 703/26 |
| 2013/0024619 | A1* | 1/2013 | Abdallah | ............. | G06F 9/30174 711/123 |
| 2013/0080805 | A1* | 3/2013 | Vick | ...................... | G06F 8/4432 713/320 |
| 2014/0089679 | A1* | 3/2014 | Goffmann | ............ | G06F 21/125 713/190 |
| 2014/0136179 | A1* | 5/2014 | Bohizic | ............... | G06F 9/45545 703/26 |
| 2014/0281376 | A1* | 9/2014 | Yamada | ................ | G06F 9/3885 712/28 |
| 2014/0298317 | A1* | 10/2014 | Devine | ..................... | G06F 8/61 717/174 |
| 2014/0358515 | A1* | 12/2014 | Sreedhar | ................ | G06F 9/4552 703/26 |
| 2015/0089502 | A1* | 3/2015 | Horovitz | ................. | G06F 9/45545 718/1 |
| 2015/0100791 | A1* | 4/2015 | Chen | ................... | G06F 12/1408 713/189 |

OTHER PUBLICATIONS

Renato Figueiredo et al., Resource Virtualization Renaissance, 2005 IEEE, [Retrieved on Jul. 30, 2018]. Retrieved from the internet: <URL: https://ieeexplore.ieee.org/stamp/stamp.jsp?tp=&arnumber=1430628> 4 Pages (28-31) (Year: 2005).*

(56) References Cited

OTHER PUBLICATIONS

Native Client, Dec. 2014, retrieved from https://terms.naver.com/entry.nhn?docId=3585971&cid=59277&categoryId=59282, 2 pages (including machine-generated translation).
Korean Office Action from Korean Patent Application No. 10-2017-7027848, dated Sep. 12, 2018, 20 pages (including machine-generated translation).

* cited by examiner

BINARY TRANSLATION INTO NATIVE CLIENT

CROSS REFERENCE TO RELATED APPLICATION

This application is related to International Patent Application being filed concurrently herewith, having Attorney Docket No. 096553-0073, and entitled, "BINARY TRANSLATION ON SHARED OBJECT LEVEL," the entire disclosure of which is incorporated herein by reference.

BACKGROUND

The subject technology is generally directed to binary translation techniques. Some software is compiled as binary programs for specific CPU architectures, such as ARM® or x86®, and specific operation system, such as Android® or Microsoft Windows®. The binary programs may be downloaded to a computer of a user over the Internet. However, the user may not trust the program and may wish to run the program in a secure mode, where the program has limited access to data stored on the computer outside of the program. As the foregoing illustrates, an approach for securely executing software on a computer may be desirable.

Native Client may be used to securely execute software on the computer. However, some software is not written for Native Client and is not compatible with Native Client. Such software may need to be recompiled and ported to Native Client, which may require a nontrivial effort for some large, modern software products. As the foregoing illustrates, translating code that is not compatible with Native Client into Native Client may be desirable.

SUMMARY

According to some aspects, the subject technology relates to a method. The method includes receiving guest software to run in a Native Client environment, wherein the guest software is configured to execute at a specified guest hardware architecture and not within the Native Client environment. The method includes providing, using emulation software, a binary translation of the guest software into Native Client compatible machine code, wherein the Native Client compatible machine code executes within a sandbox for the Native Client environment, wherein the Native Client compatible machine code is executable within an application, wherein providing the binary translation of the guest software into the Native Client compatible machine code for execution within the sandbox occurs just in time, during a runtime of the emulated guest software, and without porting or recompiling the guest software, and wherein providing the binary translation interleaves with execution of the emulated guest software. The method includes running the Native Client compatible machine code in the Native Client environment and within the sandbox.

According to some aspects, the subject technology relates to a non-transitory computer-readable medium storing instructions. The instructions include code for receiving guest software to run in a Native Client environment, wherein the guest software is configured to execute at a specified guest hardware architecture and not within the Native Client environment. The instructions include code for providing, using emulation software, a binary translation of the guest software into Native Client compatible machine code, wherein the Native Client compatible machine code executes within a sandbox for the Native Client compatible machine code, wherein the Native Client compatible machine code is executable within an application, wherein providing the binary translation of the guest software into the Native Client compatible machine code for execution within the sandbox occurs just in time, during a runtime of the emulated guest software, and without porting or recompiling the guest software, and wherein providing the binary translation interleaves with execution of the emulated guest software. Providing the binary translation of the guest software into the Native Client compatible machine code comprises: creating a set of virtual registers representing registers used by the guest software when executing at the specified guest hardware architecture, wherein the addresses of the virtual registers are referenced by a base pointer (RBP) plus a predetermined offset, and wherein each virtual register in the set of virtual registers is accessible, from within the sandbox, via a single instruction.

According to some aspects, the subject technology relates to a system. The system includes one or more processors and a memory storing instructions. The instructions include code for receiving guest software to run in a Native Client environment, wherein the guest software is configured to execute at a specified guest hardware architecture and not within the Native Client environment. The instructions include code for providing, using emulation software, a binary translation of the guest software into Native Client compatible machine code, wherein the Native Client compatible machine code executes within a sandbox for the Native Client environment, wherein the Native Client compatible machine code is executable within an application, wherein providing the binary translation of the guest software into the Native Client for execution within the sandbox software occurs just in time, during a runtime of the emulated guest software and without porting or recompiling the guest software, wherein the sandbox for the Native Client environment accesses a set of emulated guest registers stored in memory or in registers available at a host machine, wherein data associated with the Native Client compatible machine code is stored within the sandbox for the Native Client environment, and wherein the emulated guest registers correspond to registers of the specified guest hardware architecture.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, certain structures and components are shown in block diagram form in order to avoid obscuring the concepts of the subject technology.

As used herein, "Native Client" may refer to a sandboxing environment deploying software fault isolation and binary code validation approaches. Native Client implements a limited set of application programming interfaces (APIs) similar to Portable Operating System interface (POSIX) and can be executed within a web browser. "Binary translation" may refer to a mechanism to analyze machine code (called guest code) of an application or an operating system executing on one platform (the guest) to produce code suitable for execution on a different platform (the host). A "platform" may include a hardware and software stack combination. Applications are typically developed for a specific platform, such as ARM or x86. Each of the above terms also encompasses its plain and ordinary meaning.

The subject technology relates to techniques of binary translation to run existing software developed for a guest platform (e.g., Android ARM) on another platform, the host platform (e.g., Native Client x86-64), which possesses better API-level portability, security, and reliability characteristics. An application for the guest platform may be written in a portable programming language (e.g., Java) that may access native components in the form of dynamically loaded libraries. The native components may be referred to as shared objects, and may be compiled at the guest platform using the guest platform's hardware architecture and operating system. To support the application, the host platform may need to run both Java and native code. The subject technology relates to running non-portable, guest platform-specific application libraries inside the Native Client sandbox.

According to some implementations of the subject technology, in order to execute guest code within the Native Client sandbox, host code that conforms to Native Client sandboxing rules is produced. In order to achieve reasonable performance, optimization techniques may be applied. The optimization techniques may include producing just-in-time software fault isolation (SFI) compliant host code that emulates the behavior of the guest code. The optimization techniques may include storing emulated guest registers in fast storage, such as the cache in the host registers or in base pointer (RBP) relative memory. This production of host code allows for fast access without explicitly sandboxing accesses to the emulated guest context. The optimization techniques may include emulating calls to external platform shared objects using shared objects of the host, in other words, foregoing binary translation of standard libraries, when possible. This emulation strategy is described in detail in U.S. patent application being filed concurrently herewith, having Attorney Docket No. 093054-0893, and entitled, "BINARY TRANSLATION ON SHARED OBJECT LEVEL," the entire disclosure of which is incorporated herein by reference.

In some cases, the host platform may not have access to some APIs that are available at the guest platform, for example, due to security requirements. Additional techniques to emulate non-available functionality are used.

Some central processing unit (CPU) architectures support explicit marking of executable code via an appropriate bit (X-bit) in the page table. Code from virtual memory may be executed only if the X-bit is set. Direct support for X-bit manipulation from within the Native Client sandbox might, in some cases, not be allowed for security reasons. Also, as guest code execution by the binary translator does not take into account the presence of the host X bit on the guest code, such manipulations might, in some cases, not have the desired effect. To emulate functionality related to manipulation of the X-bit (e.g., typically provided using the mmap (PROT_EXEC) API on POSIX systems), additional structures manipulated by the guest mmap( ) API need to be taken into account by the binary translation engine. This may be accomplished via a bitmap in memory storing whether a particular guest page is executable or not (e.g., whether the particular guest page has its X-bit set). To avoid checking the bitmap on execution of every instruction, X-bit checks may happen during translation time. Later, changing the X-bit for executable pages may cause a code cache flush.

Native Client may not support the POSIX feature of signals. Signals may be used to provide information about exceptional situations in an application, such as a crash or an execution failure. Signals may also be used for garbage collection and managed language runtimes. Software that uses signals may, in some cases, not be able to run in the Native Client sandbox unless the binary translation engine emulates the setting of signal handlers and the delivery of the signals to the guest-specific signal handlers. Thus, in order to emulate signals, the binary translation engine may maintain an active signal mask. If a signal is to be delivered, execution of the binary translated software within the native client may be suspended, and the signal handler may be executed. After the signal handler has executed, execution of the binary translated software may resume. This processing of signals may be achieved by adding checks of the signal mask inside the binary translation dispatcher and explicitly invoking the signal handler with proper arguments using a function wrapping mechanism.

Native Client is a sandboxing technology for running native compiled code (e.g., in some cases compiled C or C++ code) securely in a browser. As used herein, the phrases "sandbox" or "sandboxing technology" may refer to a computer security mechanism for separating running programs by limiting a space in memory that a program may access. A sandboxed program is said to be able to access a memory region "inside the sandbox" and unable to access a memory region "outside the sandbox." Native Client code is independent of the operating system and can be run on any operating system, as long as support is implemented for the operating system. Native Client allows a programmer to develop, distribute, and execute native code of any client system through a web browser while maintaining the browser's security features. Native Client provides the ability to execute native code, within a sandbox and does not allow direct access to the browser or to the host operating system outside of the sandbox. Native Client may provide limited access to the browser or to the host operating system through controlled APIs. Binary translation to Native Client compatible machine code ensures that only legitimate sandboxed access happens. While aspects of the subject technology are described herein in conjunction with a browser, in alternative implementations another application may be used in place of the browser.

The subject technology translates software that is not compatible with Native Client into Native Client compatible machine code. Advantageously, a user may run software from a source that he/she does not trust and be assured that the software will run within a sandbox and will have limited access to information stored on the user's computer outside the sandbox. The translation occurs during the runtime of the emulated guest software running inside Native Client. "Just in time" translation occurs during runtime of the code, at the time when the code is executed. As a result, only code that is executed and that needs to be translated is translated. Portions of the code, which are not executed, are not translated, thereby saving time and processing resources. Binary translation technology, along with a nontrivial porting layer, may be deployed. The binary translator may translate the code of the guest software. However, standard library calls may be executed using the porting layer provided in the emulation software. The porting layer may translate the expected API of the guest platform into the set of available APIs on the Native Client. In some cases, such a translation may include translation of synchronous blocking library calls into asynchronous non-blocking calls of the Native Client, as well as emulating features of the guest hardware that are missing in the Native Client within the Native Client.

The binary translation may translate the guest software into a format that is suitable for further verification and sandboxing. Software fault isolation (SFI) techniques may be used to achieve better portability and security.

The subject technology may be seen as a special case of binary translation, where Native Client is the operating system of the host, resulting in secure programs that can run in a browser executing within any operating system. As a result of the translation into Native Client, both security and portability of the software are increased.

During binary translation, the code may be translated into a format that is compatible with the rules of Native Client. For example, Native Client requires that no instructions crossing addresses which are multiples of 32 are provided (in other words, instruction are bundle aligned). As a result, when the binary translator emits machine code, the binary translator ensures that the bundle boundary (multiple of 32) is never crossed.

In some aspects of the subject technology, a computer receives guest software to run in a Native Client environment. The guest software is configured to execute at a specified guest hardware architecture (e.g., x86 hardware or ARM hardware). The guest software may not be secure or may not be portable. The computer binary translates the guest software into Native Client compatible machine code. The Native Client compatible machine code executes within a sandbox that limits the Native Client compatible machine code's access to data stored at the host machine. The Native Client compatible machine code is secure, portable, and executable within a browser in any operating system that supports the browser.

The sandbox may be able to access a subset of a set of registers available at the host machine. Important guest data, such as guest registers, may be provided from the guest software to the Native Client compatible machine code via a subset of the set of registers or via a memory positions at an offset from registers in the subset. As binary translated code may require intensive usage of the guest registers, this approach may allow high performance emulation of the guest hardware, while still satisfying the requirements of the Native Client sandbox.

Providing a binary translation of the guest software into Native Client compatible machine code may include creating a set of virtual registers representing registers used by the guest software when executing at the host hardware architecture. The addresses of the virtual registers may be referenced by RBP plus a predetermined offset. For example, register R0 may be at position RBP, register R1 may be at position RBP+4 offset bytes, register R2 may be at position RBP+8 offset bytes, etc. As a result, each virtual register in the set of virtual registers may be accessible, from within the sandbox, via a single instruction. For example, if the write command has a format: WRITE (POSITION, VALUE), a command to write the value "0" to register R2 may be written as: WRITE (RBP+8, 0). The single instruction may be advantageous because this technique results in maximal performance of the generated code. Native Client sandboxing mechanisms allow specific exceptions for RBP-relative addressing. Specifically, a single [RBP+4*N] instruction can be used in binary translated code to access register number N. The RBP register is used as a base. In some cases, an additional sandboxing instruction may be required to ensure that the memory access is inside the sandbox.

Providing a binary translation of the guest software into Native Client compatible machine code may include emulating features of the specified guest hardware architecture and application programming interface (API) calls of the guest software within the Native Client. The features of the specified guest hardware architecture may include registers, stacks, pointers, etc. The API calls may include calls to system APIs or APIs associated with the guest software. The registers, stacks, pointers, etc., are emulated, meaning that the Native Client compatible machine code creates software representations of hardware items that behave similarly to the hardware items but exist in software executing on a processor and a memory (without the associated hardware components). Calls accessing the emulated components may be exactly the same as or similar to the calls accessing the physical components on the guest machine, allowing the running of unmodified guest code in the emulated environment.

To emulate certain aspects of the guest architecture that are not available inside the Native Client environment, such as an executable bit (X bit) and asynchronous signal processing, additional software emulation logic may be used. For example, Native Client does not allow liberal control over executable code regions or available to POSIX systems via the mmap (PROT_EXEC) interface. Thus, the emulation software may implement control over executable bits via an additional mechanism. The emulation software may keep track of executable guest code via separate data structures. Similarly, as Native Client does not support signal delivery, the emulation software may support sending asynchronous signals by periodically checking a pending signals mask and explicitly invoking a signal handler once the signal is raised. As used herein, the phrase "emulation software" or "emulator" may refer to software that allows the guest software to run inside the Native Client environment.

Figure 1A:
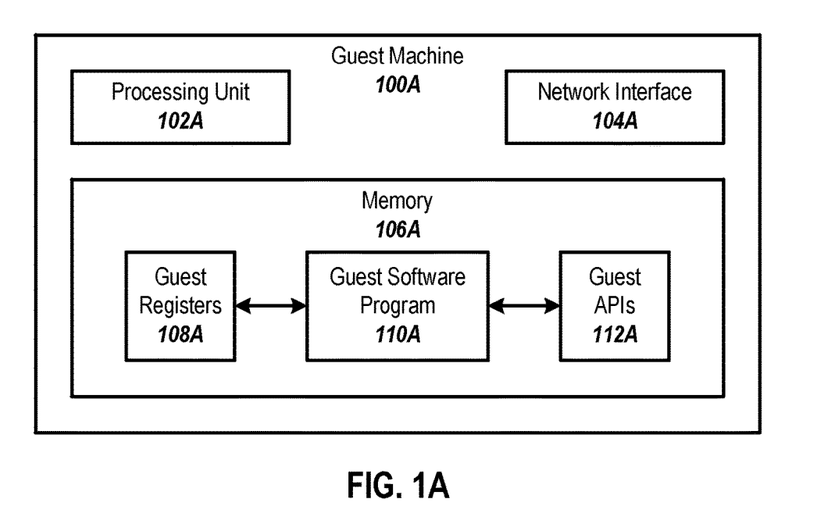
FIG. 1A illustrates an example guest machine which may be involved in binary translation into Native Client.

FIG. 1A illustrates an example guest machine 100A which may be involved in binary translation into Native Client. The guest machine 100.A may be any computing device, for example, a laptop computer, a desktop computer, a tablet computer, a mobile phone, a personal digital assistant (PDA), an electronic music player, a smart watch, a television coupled with one or more processors and a memory, etc. In some examples, the guest machine 100A has ARM hardware. Alternatively, the guest machine 100A may have x86 hardware.

As shown, the guest machine 100A includes a processing unit 102A, a network interface 104A, and a memory 106A. The processing unit 102A includes one or more processors. The processing unit 102A may include a central processing unit (CPU), a graphics processing unit (GPU), or any other processing unit. The processing unit 102A executes computer instructions that are stored in a computer-readable medium, for example, the memory 106A. The network interface 104A allows the guest machine 100A to transmit and receive data in a network, for example, the Internet, an intranet, a cellular network, a local area network, a wide area network, a wired network, a wireless network, a virtual private network (VPN), etc. The memory 106A stores data and/or instructions. The memory 106A may be one or more of a cache unit, a storage unit, an internal memory unit, or an external memory unit. As illustrated, the memory 106A includes guest registers 108A, a guest software program 110A, and guest APIs 112A.

The guest registers 108A are registers on the guest machine 100A that are associated with the hardware architecture of the guest machine 100A (e.g., ARM or x86). In addition to the registers 108A, the memory 106A may include other hardware architectures, such as stack(s) or pointer(s). The guest APIs 112A are APIs present on the guest machine 100A using which software for the guest machine 100A and its associated hardware architecture may be written. The guest APIs 112A may include system APIs associated with the hardware of the guest machine 100A or vendor APIs provided by the vendor of the guest software program 110A together with the guest software program 110A.

The guest software program 110A is a software program configured to execute on the hardware architecture of the guest machine 100A and to interface with the guest registers 108A and with the guest APIs 112A. The guest software program 110A may be unable to execute in a Native Client environment or on a hardware architecture different from that of the guest machine 100A. For example, if the guest machine 100A has ARM hardware, the guest software program 110A may be configured to execute on ARM hardware but not on x86 hardware.

Figure 1B:
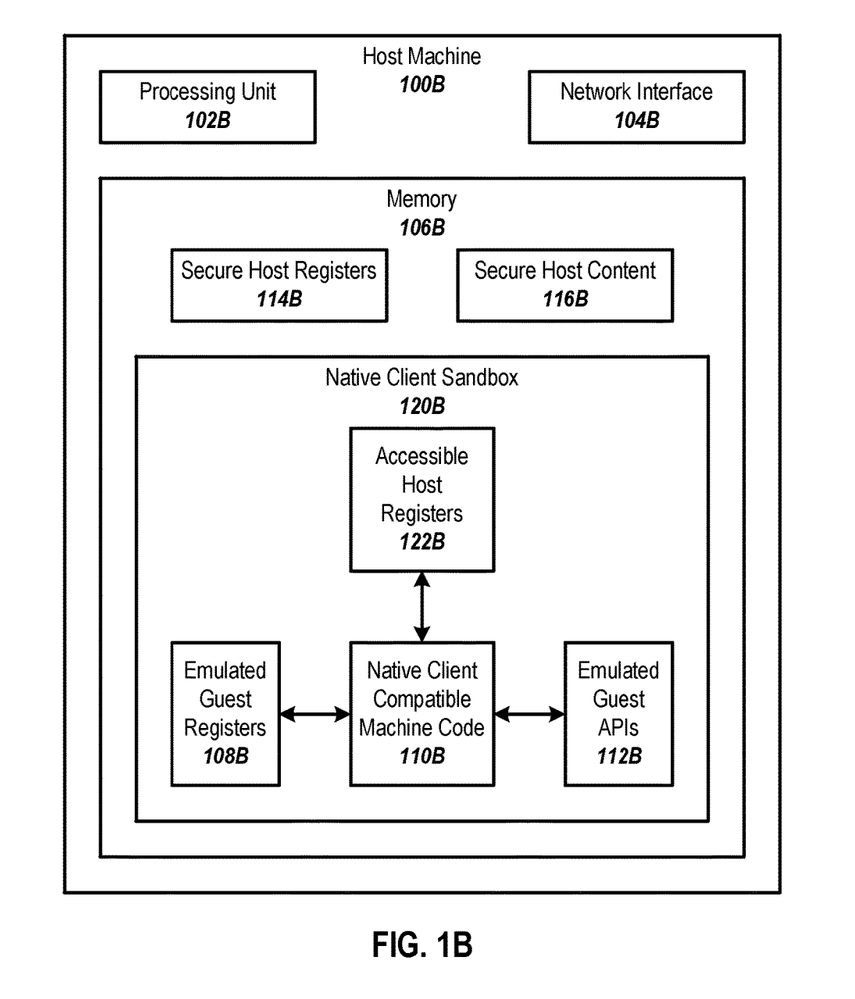
FIG. 1B illustrates an example host machine which may be involved in binary translation into Native Client.

FIG. 1B illustrates an example host machine 100B which may be involved in binary translation on a shared object level. The host machine 100B may be any computing device, for example, a laptop computer, a desktop computer, a tablet computer, a mobile phone, a personal digital assistant (PDA), an electronic music player, a smart watch, a television coupled with one or more processors and a memory, etc. The host machine 100B has a hardware architecture different from the hardware architecture of the guest machine 100A. For example, if the hardware architecture of the guest machine 100A is ARM hardware, the hardware architecture of the host machine 100B is not ARM hardware and may be, for example, x86 hardware. Alternatively, the host machine 100B may have the same hardware architecture as the guest machine 100A.

As shown, the host machine 100B includes a processing unit 102B, a network interface 104B, and a memory 106B. The processing unit 102B includes one or more processors. The processing unit 102B may include a central processing unit (CPU), a graphics processing unit (GPU), or any other processing unit. The processing unit 102B executes computer instructions that are stored in a computer-readable medium, for example, the memory 106B. The network interface 104B allows the host machine 100B to transmit and receive data in a network, for example, the Internet, an intranet, a cellular network, a local area network, a wide area network, a wired network, a wireless network, a virtual private network (VPN), etc. The memory 106B stores data and/or instructions. The memory 106B may be one or more of a cache unit, a storage unit, an internal memory unit, or an external memory unit. As illustrated, the memory 106B includes secure host registers 114B, secure host content 116B, and a Native Client sandbox 120B.

The secure host registers 114B are registers on the host machine 100B that are associated with the hardware architecture of the guest machine 100B (e.g., ARM or x86). In addition to the secure host registers 114B, the memory 106B may include other hardware architectures, such as stack(s) or pointer(s). The secure host content 116B includes content stored on the host machine 100B, such as word processing documents, photographs, videos, audio files, etc. The secure host registers 11413 and the secure host content 116B are outside the Native Client sandbox 120B and are inaccessible from the Native Client sandbox 120B.

The Native Client sandbox 120B is a secure area of the memory 106B in which Native Client code can execute. Native Client code may execute within the Native Client sandbox 120B and may not access registers or data outside the Native Client sandbox 120B, such as the secure host registers 114B or the secure host content 116B. In this way, a user of the host machine 100B may execute potentially untrusted Native Client code while being secure that his/her personal data and the secure registers of the host machine 100B are inaccessible to the potentially untrusted code.

As shown, the Native Client sandbox 120B includes accessible host registers 122B, emulated guest registers 108B, Native Client compatible machine code 110B, and emulated guest APIs 112B. The Native Client compatible machine code 110B corresponds to the guest software program 110A binary translated into Native Client. The Native Client compatible machine code 110B executes within the Native Client sandbox 120B. Similar to other Native Client code, the Native Client compatible machine code 110B may not access registers or data outside the Native Client sandbox 120B, such as the secure host registers 114B or the secure host content 116B. The Native Client compatible machine code 110B is executable within a browser, on substantially any hardware or operating system. In particular, the Native Client compatible machine code 110B may execute on the host machine 100B, which may have a hardware architecture different from the hardware architecture of the guest machine 100A. In some cases, the binary translation of the guest software program 110A into the Native Client compatible machine code 110B may occur just in time, during the runtime of the Native Client compatible machine code program, and without porting or recompiling the Native Client compatible machine code. As a result, only code that is executed and that needs to be translated is translated. Portions of the code, which are not executed, are not translated, thereby saving time and processing resources.

The emulated guest registers 108B correspond to the guest registers 108A of the guest machine 100A emulated in software that executes within the Native Client sandbox 120B. Other hardware, such as stack(s) or pointer(s), used by the guest software program 110A executing on the guest machine 100A, may also be emulated in the Native Client sandbox 120B. The registers 108B are emulated meaning that the Native Client compatible machine code creates software representations of hardware items that behave similarly to the hardware items but exist in software executing on a processor and a memory (without the associated hardware components). Calls accessing the emulated components may be exactly the same as or similar to the calls accessing the physical components on the guest machine, allowing for code to be easily ported from the guest machine 100A to the Native Client sandbox 120B. According to some cases, code of the guest software program 110A is replaced by code compatible with the Native Client environment.

The emulated guest APIs 112B correspond to the guest APIs 112A of the guest machine 100A, binary translated or emulated in software that executes within the Native Client sandbox 120B. The emulated guest APIs 112B may include emulations of system APIs associated with the hardware of the guest machine 100A or vendor APIs provided by the vendor of the guest software program 110A together with the guest software program 110A. Similarly to how the guest software program 110A accesses the guest registers 108A and the guest APIs 112A at the guest machine 100A, the corresponding Native Client compatible machine code 110B may access the emulated guest registers 108B and the emulated guest APIs 112B at the Native Client sandbox 120B.

The Native Client sandbox 120B also includes accessible host registers 122B. The accessible host registers 122B are registers of the host machine 100B that are accessible, from within the Native Client sandbox 120B, to software, including the Native Client compatible machine code 110B, executing within the Native Client sandbox 120B. The registers of the host machine may either be secure host registers 114B, inaccessible to Native Client compatible machine code, or accessible host registers 122B, which may be accessed by Native Client compatible machine code.

Figure 2:
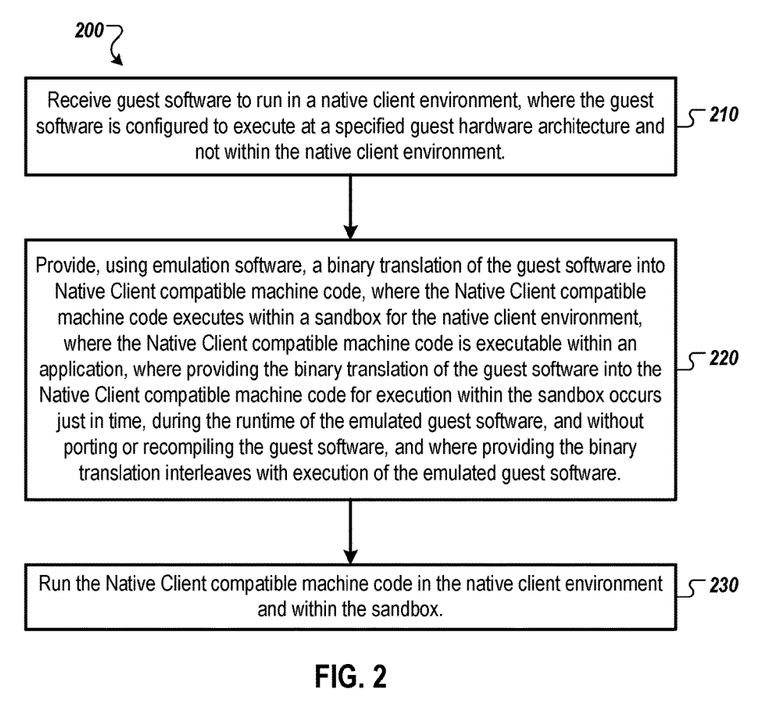
FIG. 2 illustrates an example process by which binary translation into Native Client may be completed.

FIG. 2 illustrates an example process 200 by which binary translation into Native Client may be completed.

The process 200 begins at step 210, where a host machine (e.g., host machine 100B) receives guest software (e.g., guest software program 110A) to run in a Native Client environment (e.g., Native Client sandbox 120B). The guest software is configured to execute at a specified guest hardware architecture (e.g., guest machine 100A) and not within the Native Client environment. The Native Client environment is configured to execute within any one of multiple different hardware architectures. For example, the Native Client environment may be configured to execute within an application such as a browser, that may exist in any one of multiple different hardware architectures.

In step 220, the host machine provides, using emulation software, a binary translation of the guest software into Native Client compatible machine code (e.g., Native Client compatible machine code 110B). The Native Client compatible machine code executes within a sandbox (e.g., Native Client sandbox 120B) for the Native Client environment. The Native Client compatible machine code is executable within an application, such as a browser. Providing the binary translation of the guest software into the Native Client compatible machine code for execution within the sandbox may occur just in time, during the runtime of the emulated guest software, and without porting or recompiling the guest software. Providing the binary translation interleaves with execution of the emulated guest software.

The guest software may include, for example, ARM software or x86 software, designed to execute on an ARM hardware system or an x86 hardware system. Some code in the guest software may be replaced with Native Client code or code compatible with the Native Client environment. The guest software may be, in some cases, not secure or not portable. The Native Client compatible machine code may be secure and portable. The guest software may be configured to execute only within a specified operating system. The Native Client environment may be able to execute within any one of multiple operating systems.

Providing the binary translation of the guest software into Native Client compatible machine code may include creating a set of virtual registers (e.g., emulated guest registers 108B) representing registers (e.g., guest registers 108A) used by the guest software when executing at the specified guest hardware architecture. Addresses of the virtual registers may be referenced by a base pointer (RBP) plus a predetermined offset. As a result of the RBP plus offset technique, each register may be accessible, from within the sandbox, via a single instruction. For example, register R0 may be at address RBP, register R1 may be at address RBP+4, register R2 may be at address RBP+8, register Rn may be at address RBP+4n, etc. (where n is a whole number).

Providing the binary translation of the guest software into Native Client compatible machine code may include emulating features of the guest hardware architecture and API calls of the guest software within the Native Client. System APIs or vendor APIs from the guest hardware architecture may be binary translated to execute within the Native Client sandbox. Alternatively, some of the system APIs of the guest hardware architecture may be replaced with system APIs of the Native Client sandbox.

During binary translation, the guest software may be translated into a format that is compatible with the rules of Native Client. For example, Native Client requires that no instructions crossing addresses divisible by 32 are provided. In these cases, addresses divisible by 32 may be referred to as the "bundle boundary." All instructions produced by the emulator are emitted in such a way that the instructions never cross the bundle boundary, and are padded with no-operation (NOP) instructions. The sandbox for the Native Client environment accesses a set of emulated guest registers stored in memory or in registers available at the host machine. Data associated with the Native Client compatible machine code is stored within the sandbox for the Native Client environment. The emulated guest registers correspond to registers of the specified guest hardware architecture.

In step 230, the host machine runs the Native Client compatible machine code in the Native Client environment and within the sandbox. The Native Client compatible machine code may access registers and data within the Native Client sandbox, but may not access registers or data outside the Native Client sandbox. The sandboxed software accesses emulated guest registers temporary stored in registers of the host or in memory. After step 230, the process 200 ends.

As described above, the steps 210-230 of the process 200 are implemented according to a certain order and in series. However, the steps 210-230 may be implemented in any order. In some examples, two or more of the steps 210-230 may be implemented in parallel.

Figure 3:
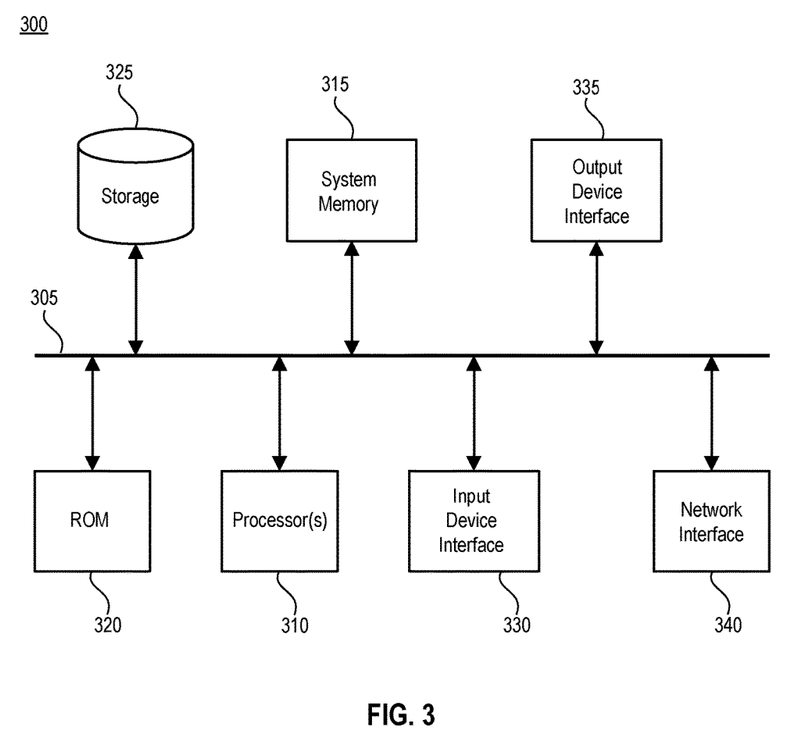
FIG. 3 conceptually illustrates an example electronic system with which some implementations of the subject technology are implemented.

FIG. 3 conceptually illustrates an electronic system 300 with which some implementations of the subject technology are implemented. For example, one or more of the guest machine 100A or the host machine 100B may be implemented using the arrangement of the electronic system 300. The electronic system 300 can be a computer (e.g., a mobile phone, PDA), or any other sort of electronic device. Such an electronic system includes various types of computer readable media and interfaces for various other types of computer readable media. Electronic system 300 includes a bus 305, processor(s) 310, a system memory 315, a read-only memory 320, a permanent storage device 325, an input device interface 330 an output device interface 335, and a network interface 340.

The bus 305 collectively represents all system, peripheral, and chipset buses that communicatively connect the numerous internal devices of the electronic system 300. For instance, the bus 305 communicatively connects the processor(s) 310 with the read-only memory 320 the system memory 315, and the permanent storage device 325.

From these various memory units, the processor(s) 310 retrieves instructions to execute and data to process in order to execute the processes of the subject technology. The processor(s) can include a single processor or a multi-core processor in different implementations.

The read-only-memory (ROM) 320 stores static data and instructions that are needed by the processor(s) 310 and other modules of the electronic system. The permanent storage device 325, on the other hand, is a read-and-write memory device. This device is a non-volatile memory unit that stores instructions and data even when the electronic system 300 is off. Some implementations of the subject technology use a mass-storage device (for example a magnetic or optical disk and its corresponding disk drive) as the permanent storage device 325.

Other implementations use a removable storage device (for example a floppy disk, flash drive or disk drive) as the permanent storage device 325. Like the permanent storage device 325, the system memory 315 is a read-and-write memory device. However, unlike storage device 325, the system memory 315 is a volatile read-and-write memory, such a random access memory. The system memory 315 stores some of the instructions and data that the processor needs at runtime. In some implementations, the processes of the subject technology are stored in the system memory 315, the permanent storage device 325, or the read-only memory 320. For example, the various memory units include instructions for binary translation into Native Client in accordance with some implementations. From these various memory units, the processor(s) 310 retrieves instructions to execute and data to process in order to execute the processes of some implementations.

The bus 305 also connects to the input and output device interfaces 330 and 335. The input device interface 330 enables the user to communicate information and select commands to the electronic system. Input devices used with input device interface 330 include, for example, alphanumeric keyboards and pointing devices (also called "cursor control devices"). Output device interfaces 335 enables, for example, the display of images generated by the electronic system 300. Output devices used with output device interface 335 include, for example, printers and display devices, for example cathode ray tubes (CRT) or liquid crystal displays (LCD). Some implementations include devices for example a touch screen that functions as both input and output devices.

Finally, as shown in FIG, 3, bus 305 also couples electronic system 300 to a network (not shown) through a network interface 340. In this manner, the electronic system 300 can be a part of a network of computers (for example a local area network (LAN), a wide area network (WAN), or an Intranet, or a network of networks, for example the Internet. Any or all components of electronic system 300 can be used in conjunction with the subject technology.

The above-described features and applications can be implemented as software processes that are specified as a set of instructions recorded on a computer readable storage medium (also referred to as computer readable medium). When these instructions are executed by one or more processor(s) (which may include, for example, one or more processors, cores of processors, or other processing units), they cause the processor(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processor and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A method comprising:
   providing a Native Client environment for running native client software in a host hardware architecture, wherein host software running on the host hardware architecture is inaccessible to the native client software;
   receiving guest software to run in a Native Client environment, wherein the guest software is configured to execute at a specified guest hardware architecture and not at the host hardware architecture or within the Native Client environment, and wherein the specified guest hardware architecture is different from that of the host hardware architecture and the Native Client environment;
   generating, within the Native Client environment, isolated from the host hardware architecture on which the Native Client environment is configured to run, a first set of software representations of hardware used in the host hardware architecture and a second set of software representations of hardware used in the guest hardware architecture; and providing, using emulation software, a binary translation of the guest software into Native Client compatible machine code for execution within the Native Client environment with the native client software and which cannot access the host software running on the host hardware architecture, including creating, within the Native Client environment, isolated from the host hardware architecture on which the Native Client environment is configured to run, a set of virtual registers representing registers used by the guest software when executing at the specified guest hardware architecture, each virtual register being accessible to the binary translation of the guest software from within the Native Client environment via a single instruction, wherein the Native Client environment is configured to execute the Native Client compatible machine code as the binary translation of the guest software into Native Client machine code is provided, and wherein the binary translation of the guest software into Native Client machine code is provided without porting or recompiling the Native Client compatible machine code.

2. The method of claim 1, wherein the Native Client environment accesses a set of emulated guest registers stored in memory or in registers available at a host machine, wherein data associated with the Native Client compatible machine code is stored within the Native Client environment, and wherein the emulated guest registers correspond to registers of the specified guest hardware architecture.

3. The method of claim 1, wherein respective addresses of the virtual registers are referenced by a base pointer (RBP) plus a predetermined offset.

4. The method of claim 1, wherein providing the binary translation of the guest software into the Native Client compatible machine code comprises:
emulating, within the Native Client environment, isolated from the host hardware architecture on which the Native Client environment is configured to run, features of the specified guest hardware architecture and application programming interface (API) calls of the guest software within the Native Client environment.

5. The method of claim 1, wherein providing the binary translation of the guest software into the Native Client compatible machine code comprises:
replacing code in the guest software with code compatible with the Native Client environment.

6. The method of claim 1, wherein the guest software comprises ARM software or x86 software.

7. The method of claim 1, wherein the Native Client compatible machine code is secure and portable, and wherein the guest software is not secure or not portable.

8. The method of claim 1, wherein the guest software is configured to execute only within a specific guest operating system, and wherein the Native Client environment is configured to execute within any one of multiple different operating systems.

9. The method of claim 1, wherein the Native Client compatible machine code is executable within an application, and wherein the application is a browser.

10. A non-transitory computer-readable medium comprising instructions which, when executed by one or more computers, cause the one or more computers to implement a method, the method comprising:

providing a Native Client environment for running native client software in a host hardware architecture, wherein host software running on the host hardware architecture is inaccessible to the native client software;

receiving guest software to run in the Native Client environment, wherein the guest software is configured to execute at a specified guest hardware architecture and not at the host hardware architecture or within the Native Client environment, and wherein the specified guest hardware architecture is different from that of the host hardware architecture and the Native Client environment;

generating, within the Native Client environment, isolated from the host hardware architecture on which the Native Client environment is configured to run, a first set of software representations of hardware used in the host hardware architecture and a second set of software representations of hardware used in the guest hardware architecture; and providing, using emulation software, a binary translation of the guest software into Native Client compatible machine code for execution within the Native Client environment with the native client software and which cannot access the host software running on the host hardware architecture, including creating, within the Native Client environment, isolated from the host hardware architecture on which the Native Client environment is configured to run, a set of virtual registers representing registers used by the guest software when executing at the specified guest hardware architecture, each virtual register being accessible to the binary translation of the guest software from within the Native Client environment via a single instruction, wherein the Native Client environment is configured to execute the Native Client compatible machine code as the binary translation of the guest software into Native Client machine code is provided, and wherein the binary translation of the guest software into Native Client machine code is provided without porting or recompiling the Native Client compatible machine code.

11. The non-transitory computer-readable medium of claim 10, wherein the Native Client environment accesses a set of emulated guest registers stored in memory or in registers available at a host machine, wherein data associated with the Native Client compatible machine code is stored within the Native Client environment, and wherein the emulated guest registers correspond to registers of the specified guest hardware architecture.

12. The non-transitory computer-readable medium of claim 10, wherein providing the binary translation of the guest software into the Native Client compatible machine code comprises:
emulating, within the Native Client environment, isolated from the host hardware architecture on which the Native Client environment is configured to run, features of the specified guest hardware architecture and application programming interface (API) calls of the guest software within the Native Client environment.

13. The non-transitory computer-readable medium of claim 10, wherein providing the binary translation of the guest software into the Native Client compatible machine code comprises:
replacing code in the guest software with code compatible with the Native Client environment.

14. The non-transitory computer-readable medium of claim 10, wherein the guest software comprises ARM software or x86 software.

15. The non-transitory computer-readable medium of claim 10, wherein the Native Client compatible machine code is secure and portable, and wherein the guest software is not secure or not portable.

16. A system comprising:
one or more processors; and
a memory comprising instructions which, when executed by the one or more processors, cause the one or more processors to implement a method, the method comprising:
providing a Native Client environment for running native client software in a host hardware architecture, wherein host software running on the host hardware architecture is inaccessible to the native client software;
receiving guest software to run in the Native Client environment, wherein the guest software is configured to execute at a specified guest hardware architecture and not at the host hardware architecture or within the Native Client environment, and wherein the specified guest hardware architecture is different from that of the host hardware architecture and the Native Client environment;
generating, within the Native Client environment, isolated from the host hardware architecture on which the Native Client environment is configured to run, a first set of software representations of hardware used in the host hardware architecture and a second set of software representations of hardware used in the guest hardware architecture; and
providing, using emulation software, a binary translation of the guest software into Native Client compatible machine code for execution within the Native Client environment with the native client software and which cannot access the host software running on the host hardware architecture, including creating, within the Native Client environment, isolated from the host hardware architecture on which the Native Client environment is configured to run, a set of virtual registers representing registers used by the guest software when executing at the specified guest hardware architecture, each virtual register being accessible to the binary translation of the guest software from within the Native Client environment via a single instruction,
wherein the Native Client environment is configured to execute the Native Client compatible machine code as the binary translation of the guest software into Native Client machine code is provided, and wherein the binary translation of the guest software into Native Client machine code is provided without porting or recompiling the Native Client compatible machine code.

17. The system of claim 16, wherein respective addresses of the virtual registers are referenced by a base pointer (RBP) plus a predetermined offset.

18. The system of claim 16, wherein providing the binary translation of the guest software into the Native Client compatible machine code comprises:
emulating, within the Native Client environment, isolated from the host hardware architecture on which the Native Client environment is configured to run, features of the specified guest hardware architecture and application programming interface (API) calls of the guest software within the Native Client environment.

19. The system of claim 16, wherein providing the binary translation of the guest software into the Native Client compatible machine code comprises:
replacing code in the guest software with code compatible with the Native Client environment.

20. The system of claim 16, wherein the guest software comprises ARM software or x86 software.

* * * * *